(12) United States Patent
Feng

(10) Patent No.: US 11,708,248 B2
(45) Date of Patent: Jul. 25, 2023

(54) LQR-BASED ANTI-SWAY CONTROL METHOD AND SYSTEM FOR LIFTING SYSTEM

(71) Applicant: Shanghai Master Matrix Information Technology Co., Ltd.

(72) Inventor: Zhi Feng, Shanghai (CN)

(73) Assignee: Shanghai Master Matrix Information Technology Co., Ltd., Shanghai (CN)

( * ) Notice: Subject to any disclaimer, the term of this patent is extended or adjusted under 35 U.S.C. 154(b) by 0 days.

(21) Appl. No.: 17/799,166

(22) PCT Filed: Feb. 26, 2021

(86) PCT No.: PCT/CN2021/078138
§ 371 (c)(1),
(2) Date: Aug. 11, 2022

(87) PCT Pub. No.: WO2021/196937
PCT Pub. Date: Oct. 7, 2021

(65) Prior Publication Data
US 2023/0107388 A1    Apr. 6, 2023

(30) Foreign Application Priority Data

Apr. 2, 2020 (CN) .......................... 202010252737.8

(51) Int. Cl.
  *B66C 13/06*     (2006.01)
  *G05B 19/4155*   (2006.01)
  *B66C 13/48*     (2006.01)
(52) U.S. Cl.
  CPC ............ *B66C 13/063* (2013.01); *B66C 13/48* (2013.01); *G05B 19/4155* (2013.01); *G05B 2219/45046* (2013.01)
(58) Field of Classification Search
  None
  See application file for complete search history.

(56) References Cited

U.S. PATENT DOCUMENTS

2020/0148510 A1*  5/2020  Rausch ................. B66C 13/066
2021/0197970 A1*  7/2021  Azeredo ................ B64C 27/04
(Continued)

FOREIGN PATENT DOCUMENTS

| CN | 105600683 A | 5/2016 |
|----|-------------|--------|
| CN | 107826978 A | 3/2018 |

(Continued)

OTHER PUBLICATIONS

International Search Report and Written Opinion for International Application No. PCT/CN2021/078138, dated Apr. 28, 2021, 7 pages.
Zhong, B., et al., "Design of an Extended State Observer for the Crane-Load System Based on Trolley's Position Information," Aug. 2014, 12 pages, vol. 36(8), Journal of Southwest University (Natural Science Edition), with translation.
(Continued)

*Primary Examiner* — Ryan A Jarrett
(74) *Attorney, Agent, or Firm* — NSIP Law

(57) ABSTRACT

The present invention provides a linear quadratic regulator (LQR)-based anti-sway control method for a hoisting system, comprising the following steps: obtaining a target position of a trolley, and obtaining a planned real-time path of the trolley according to the maximum velocity $v_m$ and maximum acceleration $a_m$ of the trolley; establishing a dynamic model of the hoisting system according to a Lagrange's equation, for the Lagrange's equation, the trolley displacement x, the spreader sway angle $\theta$, and the rope length l of the hoisting system being selected as generalized coordinate directions; observing lumped disturbance d using an extended state observer, and compensating for same in a controller, the lumped disturbance d comprising the dynamic model error and external disturbance to the hoisting system; tracking the planned real-time path of the trolley by a Q matrix and an R matrix using a linear quadratic regulator controller. The LQR-based anti-sway control method for a hoisting system provided by the present invention can make the hoisting system operate more smoothly, reduce sway (Continued)

during operation, and quickly eliminate sway when in place while observing the lumped disturbance using an extended state observer.

9 Claims, 3 Drawing Sheets

(56) References Cited

U.S. PATENT DOCUMENTS

| | | | | |
|---|---|---|---|---|
| 2022/0144596 A1* | 5/2022 | Liu | ........................ | B66C 13/063 |
| 2022/0194749 A1* | 6/2022 | Englert | .................. | B66C 13/063 |
| 2023/0060836 A1* | 3/2023 | Shao | ..................... | G05D 1/0214 |

FOREIGN PATENT DOCUMENTS

| | | |
|---|---|---|
| CN | 108358062 A | 8/2018 |
| CN | 108545610 A | 9/2018 |
| CN | 109911773 A | 6/2019 |
| CN | 111153328 A | 5/2020 |

OTHER PUBLICATIONS

Ouyang, H., et al., "Trajectory Generation for Double-Pendulum Rotary Crane," Aug. 2019, pp. 1265-1274, vol. 36 (8), Control Theory & Applications, abstract only.

He, B., "Precise Positioning Online Trajectory Planner Design and Application for Overhead Cranes," Oct. 2016, pp. 1352-1358, vol. 33(10), Control Theory & Applications, abstract only.

Li, Y., et al., "Research on the Trajectory Planning and Tracking Method of Overhead Crane," Aug. 2019, pp. 289-295, vol. 40(4), Journal of Taiyuan University of Science and Technology, abstract only.

First Chinese Office Action for Chinese Application No. 202010252737.8, dated May 21, 2020, 8 pages.

Second Chinese Office Action for Chinese Application No. 202010252737.8, dated Jun. 3, 2020, 9 pages.

Yingzhou, G., "Research on Anti Sway Control of Crane System Based on PID-LQR," China Excellent Master's Thesis Full Text Database Information Technology Series, Issue 10, 32 pages, Oct. 15, 2017, with translation.

* cited by examiner

LQR-BASED ANTI-SWAY CONTROL METHOD AND SYSTEM FOR LIFTING SYSTEM

CROSS-REFERENCE TO RELATED APPLICATIONS

This is a national phase of International Application No. PCT/CN2021/078138, filed 26 Feb. 2021, which claims priority to Chinese Application No. 202010252737.8, filed 2 Apr. 2020. The disclosure of each of these applications is incorporated herein by reference in its entirety for all purposes.

TECHNICAL FIELD

The present invention relates to the field of hoisting system transportation, and more particularly to a LQR-based anti-sway control method and system for a hoisting system.

BACKGROUND ART

Hoisting systems such as tire cranes, rail cranes, bridge cranes, etc. are widely used in the field of industrial transportation because of their strong load capacity and high flexibility. Tire cranes and bridge cranes are the two most common equipment in port terminals, which are respectively responsible for the container transportation between ships and internal trucks, between yards and internal trucks, and between yards and external trucks. At present, the hoisting system operation of port terminals is mostly manual. With the improvement of the requirements for throughput, gradually the manual operation mode can not meet the demand.

The operation process of the hoisting system is mainly divided into three stages: rising, falling and moving. In actual operation, the key link affecting the efficiency is the moving stage. Moving will cause the spreader of the hoisting system to shake, so that the container can not be accurately grasped when the spreader is lowered. Therefore, it is particularly important to control the anti-sway of the trolley or cart in the moving stage. Hoisting system is a typical underactuated system, which is a system with independent control input variable degrees of freedom less than the system degrees of freedom. The underactuated system has fewer actuators. Although it has the advantage of low cost, the underactuated system brings difficulties to the system control. For the movement of the hoisting system, the goal is to reach the designated position quickly and accurately and the sway angle is as small as possible in the process of movement, but the hoisting system can not directly act on the sway angle, but can only control its position or velocity.

Accordingly, there is a need to provide an anti-sway method, which can control the shaking of the hoisting system in the moving stage.

SUMMARY OF THE INVENTION

The technical problem to be solved by the present invention is to provide a LQR-based anti-sway control method and system for a hoisting system which can control the shaking of the hoisting system in the moving stage and quickly eliminate sway when in place by using an extended state observer and a linear quadratic regulator.

The technical solution adopted by the present invention to solve the above technical problem is to provide a LQR-based anti-sway control method for a hoisting system, characterized in that comprising the following steps:

obtaining a target position of a trolley, and obtaining a planned real-time path of the trolley according to the maximum velocity $v_m$ and maximum acceleration $a_m$ of the trolley;

establishing a dynamic model of the hoisting system according to a Lagrange's equation, for the Lagrange's equation, the trolley displacement x, the spreader sway angle $\theta$, and the rope length l of the hoisting system being selected as generalized coordinate directions;

observing lumped disturbance d using an extended state observer, and compensating for same in a controller, the lumped disturbance d comprising the dynamic model error and external disturbance to the hoisting system; tracking the planned real-time path of the trolley by a Q matrix and an R matrix using a linear quadratic regulator controller.

Optionally, obtaining the planned real-time path of the trolley according to the maximum velocity $v_m$ and maximum acceleration $a_m$ of the trolley specifically comprising the following formula:

$$\dot{x}_r(t) = \begin{cases} \frac{v_m}{2}\left(1 - \cos\pi\frac{2a_m}{v_m}t\right), & 0 < t \le \frac{v_m}{2a_m} \\ v_m, & \frac{v_m}{2a_m} < t \le \frac{v_m}{2a_m} + t_c \\ \frac{v_m}{2}\left[1 + \cos\pi\frac{2a_m}{v_m}\left(t - \frac{v_m}{2a_m} - t_c\right)\right], & \frac{v_m}{2a_m} + t_c \le t \le \frac{v_m}{a_m} + t_c \end{cases}$$

wherein, t is the running time of the trolley, $t_c$ is the constant velocity time of the trolley, $\dot{x}_r(t)$ is the real-time velocity of the planned path of the trolley, obtaining the planned real-time path of the trolley by integrating, the constant velocity time $t_c$ is determined according to the target position path of the trolley. Optionally, establishing a nonlinear equation of the system according to the Lagrange equation as follows:

$$\begin{cases} (M+m)\ddot{x} + m\ddot{l}\sin\theta + 2m\dot{l}\dot{\theta}\cos\theta + ml\ddot{\theta}\cos\theta - ml\dot{\theta}^2\sin\theta + \mu\dot{x} = F \\ 2\dot{l}\dot{\theta} + l\ddot{\theta} + \ddot{x}\cos\theta + g\sin\theta = 0 \\ m\ddot{l} + m\ddot{x}\sin\theta - ml\dot{\theta}^2 - mg\cos\theta = F_1 \end{cases}$$

wherein, M is the trolley mass, m is the spreader mass, and l is the rope length, $\theta$ is the spreader sway angle, $\mu$ is the friction coefficient, x is the trolley displacement, F is the motor force, $F_1$ is the pulling force between the trolley and the spreader, and g is the gravitational acceleration.

Optionally, the rope length l remains unchanged, the spreader sway angle $\theta$ is greater than $-5°$ and less than $5°$, simplifying the nonlinear equation as follows:

$$\dot{l} = \ddot{l} = 0, \cos\theta \approx 1, \sin\theta \approx \theta$$

$$\ddot{\theta}\cos\theta - \dot{\theta}^2\sin\theta = \frac{d}{dt}(\dot{\theta}\cos\theta) = \frac{d}{dt}(\dot{\theta}) = \ddot{\theta}$$

obtaining the following linearization equation by further linearization:

$$\begin{cases} M\ddot{x} = mg\theta + \mu\dot{x} + F \\ l\ddot{\theta} + \ddot{x} + g\theta = 0 \end{cases}$$

Optionally, obtaining the following equation by introducing a lumped disturbance d in the linearization equation:

$$\begin{cases} M\ddot{x} - mg\theta + \mu\dot{x} - d = F \\ l\ddot{\theta} + \ddot{x} + g\theta = 0 \end{cases}$$

taking the state variables as the trolly displacement x and spreader sway angle θ, input as motor force F, establishing the following state equation, and rewriting the said equation into the standard state equation form in control theory:

$$\begin{cases} \dot{X} = AX + B(u+d) \\ y_m = C_m X \end{cases}$$

wherein:

$$A = \begin{bmatrix} 0 & 1 & 0 & 0 \\ 0 & -\dfrac{\mu}{M} & \dfrac{mg}{M} & 0 \\ 0 & 0 & 0 & 1 \\ 0 & \dfrac{\mu}{Ml} & -\dfrac{(M+m)g}{Ml} & 0 \end{bmatrix}$$

$$B = \begin{bmatrix} 0 & \dfrac{1}{M} & 0 & -\dfrac{1}{Ml} \end{bmatrix}^T$$

$$C_m = [1 \; 0 \; 0 \; 0]$$

u is the control variable, X is the vector representing the system state, $y_m$ is the system output, A is the system state matrix, B is the system input matrix, Cm is the system output matrix, and the subscript m represents the directly observable.

Optionally, a new variable $x_5 = d$ is introduced into the state equation, d is used to represent lumped disturbance:

$$\begin{cases} \dot{x}_1 = x_2 \\ \dot{x}_2 = \dfrac{1}{M}(-\mu x_2 + mg x_3 + x_5 + u) \\ \dot{x}_3 = x_4 \\ \dot{x}_4 = -\dfrac{1}{Ml}(-\mu x_2 + (M+m)g x_3 + x_5 + u) \\ \dot{x}_5 = \dot{d} \end{cases}$$

$$y_m = C_m X$$

wherein, $x_1$ is the displacement of the trolley, $x_2$ is the trolley velocity, $x_3$ is the spreader sway angle, $x_4$ is the angle velocity of the spreader sway angle.

Optionally, in order to realize the observation of system state and lumped disturbance, the extended state observer is designed as follows:

$$\begin{cases} \dot{\hat{x}}_1 = \hat{x}_2 + l_1(\hat{x}_1 - x_1) \\ \dot{\hat{x}}_2 = \dfrac{1}{M}(-\mu \hat{x}_2 + mg \hat{x}_3 + \hat{x}_5 + u) + l_2(\hat{x}_1 - x_1) \\ \dot{\hat{x}}_3 = \hat{x}_4 + l_3(\hat{x}_1 - x_1) \\ \dot{\hat{x}}_4 = -\dfrac{1}{Ml}[-\mu \hat{x}_2 + (M+m)g \hat{x}_3 + \hat{x}_5 + u] + l_4(\hat{x}_1 - x_1) \\ \dot{\hat{x}}_5 = l_5(\hat{x}_1 - x_1) \end{cases}$$

wherein, $\hat{x}_1$, $\hat{x}_2$, $\hat{x}_3$, $\hat{x}_4$, $\hat{x}_5$ is the observed value of $x_1$, $x_2$, $x_3$, $x_4$, $x_5$, $l_1$, $l_2$, $l_3$, $l_4$, $l_5$ is the observer gain to be designed.

Optionally, tracking the planned real-time path of the trolley by a Q matrix and an R matrix using a linear quadratic regulator controller comprising the use of the following composite control:

$$u = K_x[\hat{x}_1 \; \hat{x}_2 \; \hat{x}_3 \; \overline{x}_4] - \hat{x}_5$$

wherein, $K_x$ is the feedback control gain.

The technical solution adopted by the present invention to solve the above technical problem is to provide a LQR-based anti-sway control system for a hoisting system, comprising: a server which comprising a memory, a processor and a computer program stored on the memory and running on the processor, when the the program executed by the processor, the said LQR-based anti-sway control method for the hoisting system is executed.

The technical solution adopted by the present invention to solve the above technical problem is to provide a computer readable storage medium on which a computer program is stored, when the program is executed by a processor, the said LQR-based anti-sway control method for the hoisting system is executed.

Compared to the prior art, the technical solutions of embodiments of the present invention have the following advantageous effects.

The LQR-based anti-sway control method for a hoisting system provided by the present invention, obtaining a target position of a trolley, and obtaining a planned real-time path of the trolley according to the maximum velocity $v_m$ and maximum acceleration $a_m$ of the trolley and establishing a dynamic model of the hoisting system according to a Lagrange's equation, which can make the hoisting system operate more smoothly, reduce sway during operation, and quickly eliminate sway when in place while observing the lumped disturbance using an extended state observer.

DETAILED DESCRIPTION OF THE INVENTION

The present invention will be further described below in combination with the accompanying drawings and embodiments.

In the following description, many specific details are set forth in order to provide a thorough understanding of the present invention. However, it will be apparent to those skilled in the art that the present invention can be practiced without these specific details. Therefore, the specific details are only exemplary, and the specific details may vary from the spirit and scope of the unrestrained and are still considered to be within the spirit and scope of the present invention.

The hoisting system in this embodiment can be used for port logistics. The hoisting system includes a crane, which includes but is not limited to a tire crane, a straddle carrier and a stacker. The following takes a tire crane as an example to illustrate the working principle of the automatic deviation correction control method of the hoisting system of the present invention.

Figure 1:
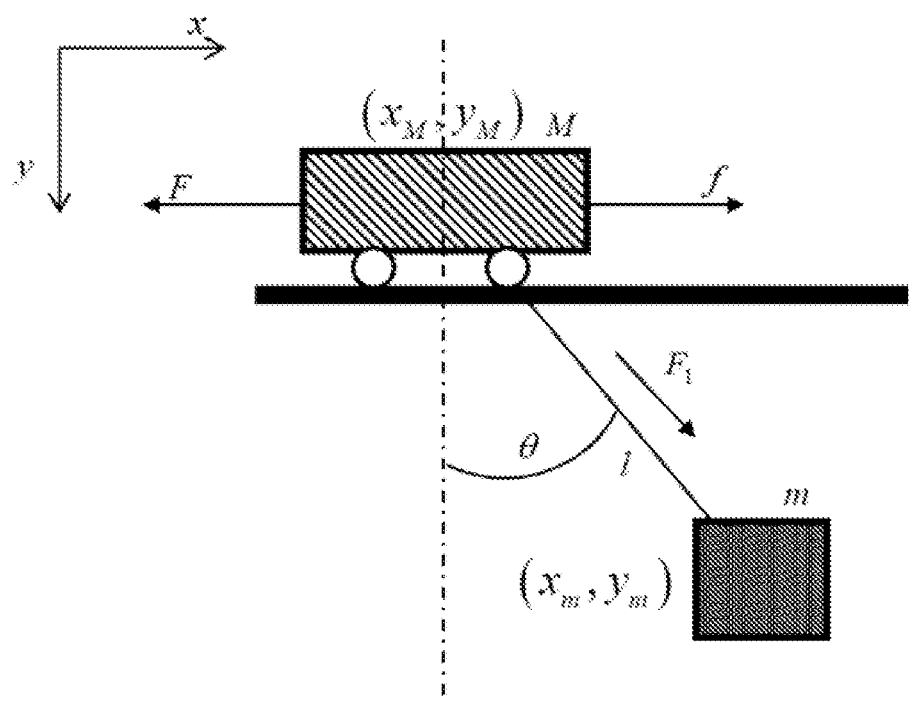
FIG. 1 is a physical schematic diagram of the two-dimensional movement of the hoisting system according to an embodiment of the present invention.

Now refer to FIG. 1, FIG. 1 is a physical schematic diagram of the two-dimensional movement of the hoisting system according to an embodiment of the present invention. Wherein, M is the trolley mass, m is the spreader mass, and l is the rope length, θ is the spreader sway angle, is the friction coefficient, x is the trolley displacement, F is the motor force, $F_1$ is the pulling force between the trolley and the spreader, and g is the gravitational acceleration.

Figure 2:
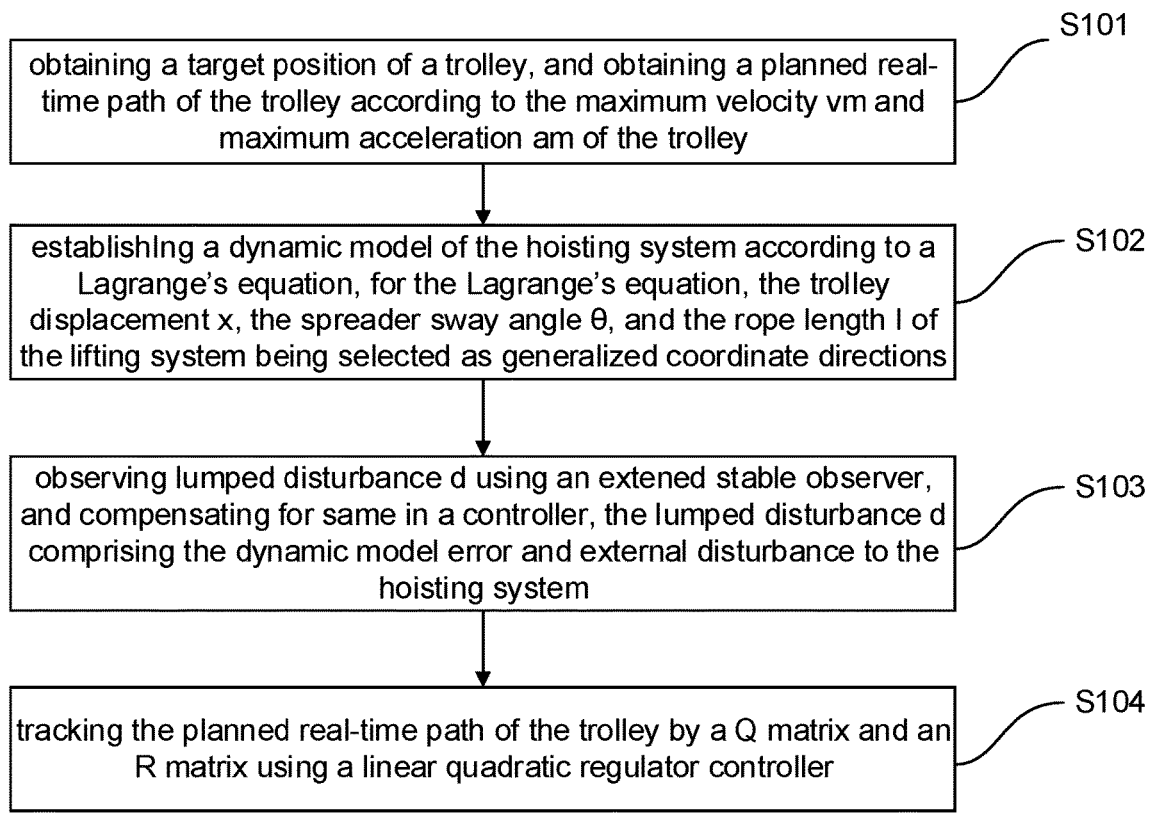
FIG. 2 is a flow chart of a LQR-based anti-sway control method for a hoisting system according to an embodiment of the present invention.

FIG. 2 is a flow chart of a Linear Quadratic Regulator (LQR)-based anti-sway control method for a hoisting system according to an embodiment of the present invention. First step 101: obtaining a target position of a trolley, and obtaining a planned real-time path of the trolley according to the maximum velocity $v_m$ and maximum acceleration $a_m$ of the trolley. Then step 102: establishing a dynamic model of the hoisting system according to a Lagrange's equation, for the Lagrange's equation, the trolley displacement x, the spreader sway angle θ, and the rope length l of the hoisting system being selected as generalized coordinate directions. Then step 103: observing lumped disturbance d using an extended state observer, and compensating for same in a controller, the lumped disturbance d comprising the dynamic model error and external disturbance to the hoisting system. Last step 104: tracking the planned real-time path of the trolley by a Q matrix and an R matrix using a linear quadratic regulator controller.

Wherein, a Q matrix and an R matrix are inherent matrices in LQR (linear quadratic regulator) method. Q is the weight matrix of state variables and diagonal matrix. The larger the corresponding value of Q, the more important the state is in the performance function. R is the weight of the control quantity. The larger the corresponding value of R, the more important the state is in the performance function.

In a particular implementation, obtaining the planned real-time path of the trolley according to the maximum velocity $v_m$ and maximum acceleration $a_m$ of the trolley specifically comprising the following formula:

$$\dot{x}_r(t) = \begin{cases} \frac{v_m}{2}\left(1 - \cos\pi\frac{2a_m}{v_m}t\right), & 0 < t \le \frac{v_m}{2a_m} \\ v_m, & \frac{v_m}{2a_m} < t \le \frac{v_m}{2a_m} + t_c \\ \frac{v_m}{2}\left[1 + \cos\pi\frac{2a_m}{v_m}\left(t - \frac{v_m}{2a_m} - t_c\right)\right], & \frac{v_m}{2a_m} + t_c \le t \le \frac{v_m}{a_m} + t_c \end{cases}$$

wherein, t is the running time of the trolley, $t_c$ is the constant velocity time of the trolley, $\dot{x}_r(t)$ is the real-time velocity of the planned path of the trolley, obtaining the planned real-time path of the trolley by integrating $\dot{x}_r(t)$, the constant velocity time $t_c$ is determined according to the target position path of the trolley.

For the vibration system with multiple degrees of freedom, the Lagrange equation in the dynamic model of the hoisting system established according to the Lagrange equation is as follows:

$$\begin{cases} L(q, \dot{q}) = T(q, \dot{q}) - V(q, \dot{q}) \\ \frac{d}{dt}\left(\frac{\partial L}{\partial \dot{q}_i}\right) - \frac{\partial L}{\partial q_i} = Q_i \end{cases}$$

Wherein, q represents generalized coordinates, Q represents generalized force, L represents Lagrangian operator, T represents kinetic energy of the system, V represents potential energy of the system.

The crane operation scenario is relatively complex, and the following assumptions are first made when modeling:
1. During the movement of the trolley or the cart, the trolley or the cart is in a static state.
2. There is friction between the trolley and the track, and the friction is proportional to the trolley velocity.
3. Because cranes mostly use spreaders with eight rope, the spreaders are regarded as particles in two-dimensional motion.
4. Ignore the influence of air resistance, wind force, friction between trolley and steel wire rope and other factors.

Selecting three generalized coordinates of the rope length l, the spreader sway angle θ and the trolley displacement x according to the said dynamic differential equation to establish a nonlinear equation of the system according to the Lagrange equation as follows:

$$\begin{cases} (M+m)\ddot{x} + m\ddot{l}\sin\theta + 2m\dot{l}\dot{\theta}\cos\theta + ml\ddot{\theta}\cos\theta - ml\dot{\theta}^2\sin\theta + \mu\dot{x} = F \\ 2\dot{l}\dot{\theta} + l\ddot{\theta} + \ddot{x}\cos\theta + g\sin\theta = 0 \\ m\ddot{l} + m\ddot{x}\sin\theta - ml\dot{\theta}^2 - mg\cos\theta = F_1 \end{cases}$$

wherein, M is the trolley mass, m is the spreader mass, and l is the rope length, θ is the spreader sway angle, is the friction coefficient, x is the trolley displacement, F is the motor force, $F_1$ is the pulling force between the trolley and the spreader, and g is the gravitational acceleration.

In the process of crane operation, the movement of the cart and the trolley is often carried out separately, so it can be considered that the rope length l remains unchanged. At the same time, because the steel wire rope length l is relatively long, in order to ensure the safety of operation and avoid collision, the spreader sway angle θ can not be too big, the spreader sway angle θ is greater than −5° and less than 5°, simplifying the nonlinear equation as follows:

$$\dot{l} = \ddot{l} = 0, \cos\theta \approx 1, \sin\theta \approx \theta$$

$$\ddot{\theta}\cos\theta - \dot{\theta}^2\sin\theta = \frac{d}{dt}(\dot{\theta}\cos\theta) = \frac{d}{dt}(\dot{\theta}) = \ddot{\theta}$$

obtaining the following linearization equation by further linearization:

$$\begin{cases} M\ddot{x} - mg\theta + \mu\dot{x} = F \\ l\ddot{\theta} + \ddot{x} + g\theta = 0 \end{cases}$$

Obtaining the following equation by introducing the lumped disturbance d in the linearization equation:

$$\begin{cases} M\ddot{x} - mg\theta + \mu\dot{x} = F \\ l\ddot{\theta} + \ddot{x} + g\theta = 0 \end{cases}$$

taking the state variables as the trolley displacement x and spreader sway angle θ, input as motor force F, establishing the following state equation, and rewriting the said equation into the standard state equation form in control theory:

$$\begin{cases} \dot{X} = AX + B(u+d) \\ y_m = C_m X \end{cases}$$

wherein:

$$A = \begin{bmatrix} 0 & 1 & 0 & 0 \\ 0 & -\dfrac{\mu}{M} & \dfrac{mg}{M} & 0 \\ 0 & 0 & 0 & 1 \\ 0 & \dfrac{\mu}{Ml} & -\dfrac{(M+m)g}{Ml} & 0 \end{bmatrix}$$

$$B = \begin{bmatrix} 0 & \dfrac{1}{M} & 0 & -\dfrac{1}{Ml} \end{bmatrix}^T$$

$$C_m = [1 \ 0 \ 0 \ 0]$$

u is the control variable, X is the vector representing the system state, $y_m$ is the system output, A is the system state matrix, B is the system input matrix, Cm is the system output matrix, and the subscript m represents the directly observable.

A new variable $x_5 = d$ is introduced into the state equation, d is used to represent lumped disturbance:

$$\begin{cases} \dot{x}_1 = x_2 \\ \dot{x}_2 = \dfrac{1}{M}(-\mu x_2 + mgx_3 + x_5 + u) \\ \dot{x}_3 = x_4 \\ \dot{x}_4 = -\dfrac{1}{Ml}(-\mu x_2 + (M+m)gx_3 + x_5 + u) \\ \dot{x}_5 = \dot{d} \\ y_m = C_m X \end{cases}$$

wherein, $x_1$ is the trolley displacement, $x_2$ is the trolley velocity, $x_3$ is the spreader sway angle, $x_4$ is the angle velocity of the spreader sway angle.

In actual operation, the spreader sway angle θ It is difficult to measure accurately, and the system modeling errors including the change of lifting weight and rope length l, as well as external disturbances including wind, will affect the control performance. The extended state observer is used to observe the lumped disturbance d and compensate in the controller, the lumped disturbance d includes system modeling errors and external disturbances.

A new variable $x_5 = d$ is introduced into the state equation, d is used to represent lumped disturbance:

$$\begin{cases} \dot{x}_1 = x_2 \\ \dot{x}_2 = \dfrac{1}{M}(-\mu x_2 + mgx_3 + x_5 + u) \\ \dot{x}_3 = x_4 \\ \dot{x}_4 = -\dfrac{1}{Ml}(-\mu x_2 + (M+m)gx_3 + x_5 + u) \\ \dot{x}_5 = \dot{d} \\ y_m = C_m X \end{cases}$$

wherein, $x_1$ is the trolley displacement, $x_2$ is the trolley velocity, $x_3$ is the spreader sway angle, $x_4$ is the angle velocity of the spreader sway angle.

The system modeling error and external disturbance d appear in the two channels $x_2$, $x_4$ with equal values, so the state equation is rewritten as follows:

$$\begin{cases} \dot{x}_1 = x_2 \\ \dot{x}_2 = -\dfrac{\mu}{M}x_2 + \dfrac{mg}{M}x_3 + \dfrac{1}{M}u + d \\ \dot{x}_3 = x_4 \\ \dot{x}_4 = -\dfrac{\mu}{Ml}x_2 + \dfrac{(M+m)g}{lM}x_3 - \dfrac{1}{Ml}u + d \end{cases}$$

In order to realize the observation of system state and lumped disturbance, the extended state observer is designed as follows:

$$\begin{cases} \dot{\hat{x}}_1 = \hat{x}_2 + l_1(\hat{x}_1 - x_1) \\ \dot{\hat{x}}_2 = \dfrac{1}{M}(-\mu \hat{x}_2 + mg\hat{x}_3 + \hat{x}_5 + u) + l_2(\hat{x}_1 - x_1) \\ \dot{\hat{x}}_3 = \hat{x}_4 + l_3(\hat{x}_1 - x_1) \\ \dot{\hat{x}}_4 = -\dfrac{1}{Ml}[-\mu \hat{x}_2 + (M+m)g\hat{x}_3 + \hat{x}_5 + u] + l_4(\hat{x}_1 - x_1) \\ \dot{\hat{x}}_5 = l_5(\hat{x}_1 - x_1) \end{cases}$$

wherein, $\hat{x}_1$, $\hat{x}_2$, $\hat{x}_3$, $\hat{x}_4$, $\hat{x}_5$ is the observed value of $x_1$, $x_2$, $x_3$, $x_4$, $x_5$, $l_1$, $l_2$, $l_3$, $l_4$, $l_5$ is the observer gain to be designed.

In a particular implementation, tracking the planned real-time path of the trolley by a Q matrix and an R matrix using a linear quadratic regulator controller comprising the use of the following composite control:

$$U = K_x[\hat{x}_1 \ \hat{x}_2 \ \hat{x}_3 \ \hat{x}_4] - \hat{x}_5$$

wherein, $K_x$ is the feedback control gain.

Figure 3:
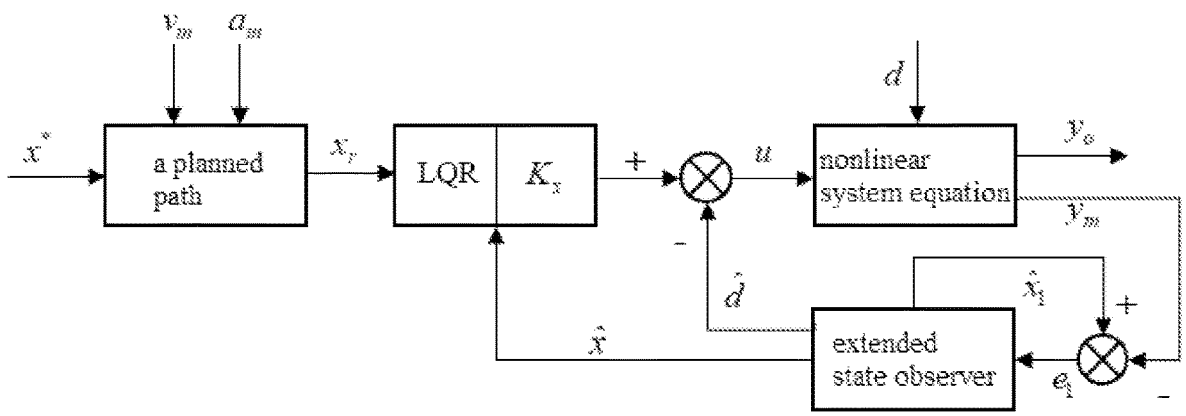
FIG. 3 is a control structure diagram of a LQR-based anti-sway control method for a hoisting system according to an embodiment of the present invention.

FIG. 3 is a control structure diagram of a LQR-based anti-sway control method for a hoisting system according to an embodiment of the present invention. Now refer to FIG. 3, wherein, x* is the target position of the trolley, $v_m$ is the maximum trolley velocity, a m is the maximum acceleration, $x_r$ is the planned real-time path of the trolley, $K_x$ is the feedback control gain, U is the control quantity, that is, the controller output, d is the lumped disturbance of the system modeling error and external disturbance, $e_1$ is the state error, $\hat{d}$ is the disturbance observation value, and the expanded state observer is used to observe the lumped disturbance d and compensate it in the controller, $y_o$, $y_m$ are output and observable output respectively. The stability of the LQR-based anti-sway control method of the hoisting system is analyzed. It is assumed that the lumped interference d and its derivatives $\dot{d}$ are bounded, and that the lumped interference d has a constant value in the steady state, that is, d satisfies $$\lim_{t\to\infty} d(t) = d_s, \lim_{t\to\infty} \dot{d}(t) = 0,$$

wherein $d_s$ is a constant vector.

$$\begin{cases} \dot{\hat{x}}_1 = \hat{x}_2 + l_1(\hat{x}_1 - x_1) \\ \dot{\hat{x}}_2 = \dfrac{1}{M}(-\mu\hat{x}_2 + mg\hat{x}_3 + \hat{x}_5 + u) + l_2(\hat{x}_1 - x_1) \\ \dot{\hat{x}}_3 = \hat{x}_4 + l_3(\hat{x}_1 - x_1) \\ \dot{\hat{x}}_4 = -\dfrac{1}{Ml}[-\mu\hat{x}_2 + (M+m)g\hat{x}_3 + \hat{x}_5 + u] + l_4(\hat{x}_1 - x_1) \\ \dot{\hat{x}}_5 = l_5(\hat{x}_1 - x_1) \end{cases}$$

Assuming that the above conditions are satisfied, the extended state observer designed $l_1, l_2, l_3, l_4, l_5$ in the above equation is asymptotically stable.

The error system can be written as the following equation:

$$\begin{cases} \dot{e}_1 = e_2 + l_1 e_1 \\ \dot{e}_2 = \dfrac{1}{M}(-\mu e_2 + mg e_3 + e_5 + u) + l_2 e_1 \\ \dot{e}_3 = e_4 + l_3 e_1 \\ \dot{e}_4 = -\dfrac{1}{Ml}[-\mu e_2 + (M+m)g e_3 + e_5 + u] + l_4 e_1 \\ \dot{e}_5 = l_5 e_1 - \dot{d} \end{cases}$$

Wherein, $e_i = \hat{x}_i - x_i$, (i=1, 2, 3, 4, 5) represents the estimation error, the coefficient matrix $\overline{A}$ of the error system is as follows, $\overline{A}$ is a Hurwitz matrix:

$$\overline{A} = \begin{bmatrix} l_1 & 1 & 0 & 0 & 0 \\ l_2 & -\dfrac{\mu}{M} & \dfrac{m}{M}g & 0 & 1 \\ l_3 & 0 & 0 & 1 & 0 \\ l_4 & \dfrac{\mu}{Ml} & -\dfrac{M+m}{Ml}g & 0 & 1 \\ l_5 & 0 & 0 & 0 & 0 \end{bmatrix}$$

According to the Input State Stability (ISS) theory, if $\overline{A}$ is a Hurwitz matrix, it can be concluded that the error system conforms to the ISS theory. It is assumed that the lumped interference d and its derivatives $\dot{d}$ are bounded, and that the lumped interference d has a constant value in the steady state, the stability of the extended state observer can be achieved. Therefore, the error dynamics of the extended state observer are asymptotically stable and satisfies $$\lim_{t \to \infty} e_i = 0.$$

$$\begin{cases} \dot{X} = AX + B(u+d) \\ y_m = C_m X \end{cases}$$

$$u = K_x \hat{X} + \hat{d}$$

Combining the above two formulas, the following closed-loop equations of the crane system can be obtained:

$$\dot{X} = (A + BK_x)X$$

Wherein, $K_x$ is the feedback control gain, $\hat{d}$ is the observed value.

The control performance of the LQR-based anti-sway control method of the hoisting system in the embodiment is verified by simulation. After the Q matrix and R matrix are configured as follows, they can be calculated $K_x$=[8.94, 19.52, −8.78, 4.47]

$$Q = \begin{bmatrix} 80 & 0 & 0 & 0 \\ 0 & 180 & 0 & 0 \\ 0 & 0 & 1800 & 0 \\ 0 & 0 & 0 & 20 \end{bmatrix}, R = 1$$

The observer gain in the following formula is designed as L=diag(100, 397, −776, 1943, −2894)

$$\begin{cases} \dot{\hat{x}}_1 = \hat{x}_2 + l_1(\hat{x}_1 - x_1) \\ \dot{\hat{x}}_2 = \dfrac{1}{M}(-\mu\hat{x}_2 + mg\hat{x}_3 + \hat{x}_5 + u) + l_2(\hat{x}_1 - x_1) \\ \dot{\hat{x}}_3 = \hat{x}_4 + l_3(\hat{x}_1 - x_1) \\ \dot{\hat{x}}_4 = -\dfrac{1}{Ml}[-\mu\hat{x}_2 + (M+m)g\hat{x}_3 + \hat{x}_5 + u] + l_4(\hat{x}_1 - x_1) \\ \dot{\hat{x}}_5 = l_5(\hat{x}_1 - x_1) \end{cases}$$

In the simulation experiment, the effects of whether to use a planned path and various controllers are compared. In the first simulation, the control effects of whether to use a planned path are compared. In the second simulation, the effects of various controllers are compared, and the anti-interference performance of the proposed method is tested, that is, increasing the disturbance when the system reaches the steady state (20 s).

Figure 4:
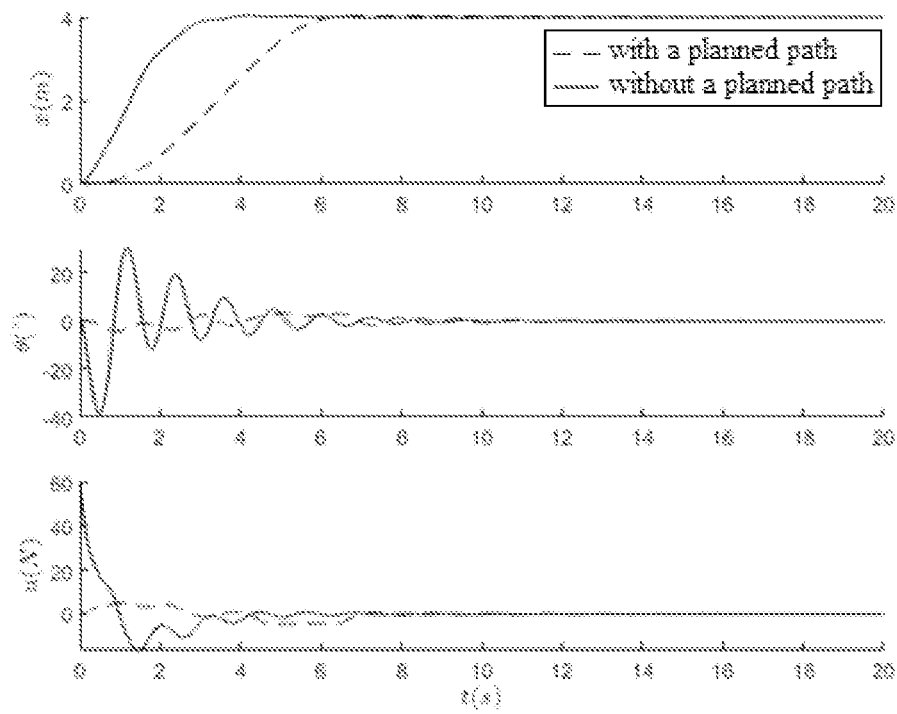
FIG. 4 is a comparison diagram of the trolley displacement, angle and control amount whether a planned path is used in an embodiment of the present invention.
Figure 5:
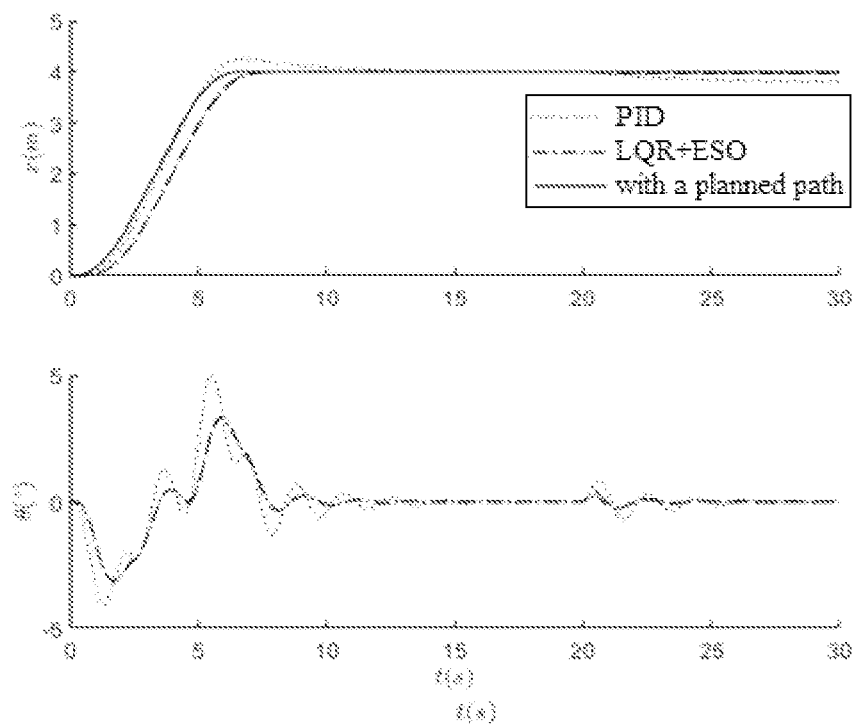
FIG. 5 shows the control effect comparison diagram between the LQR controller based on the extended state observer in an embodiment of the present invention and other controllers.

FIG. 4 is a comparison diagram of the trolley displacement, angle and control amount whether a planned path is used in an embodiment of the present invention. FIG. 5 shows the control effect comparison diagram between the LQR controller based on the extended state observer in an embodiment of the present invention and other controllers. PID marked in FIG. 5 refers to PID (proportional integral derivative control) controller, which is one of the most commonly used controllers. LQR+ESO (Extended State Observer) marked in FIG. 5 represents the combination of extended state observer and LQR controller. It is obvious from these two figures that, compared with not using a planned path, although it is slow in place by using a planned path, but its spreader sway angle is smaller and its impact on the actuator is smaller. LQR controller can use a Q matrix and an R matrix to configure the weight of the trolley displacement, spreader sway angle and other state variables, and ESO extended state observer can observe the system disturbance. Therefore, compared with PID controller, LQR controller based on ESO extended state observer can better track the path, and the spreader sway angle is smaller. When the system disturbance occurs, it can also quickly recover without static error under the control of this controller.

The embodiment of the present invention also provides a LQR-based anti-sway control system for a hoisting system, comprising: a server which comprising a memory, a processor and a computer program stored on the memory and running on the processor, when the the program executed by the processor, the said LQR-based anti-sway control method for the hoisting system is executed.

The embodiment of the present invention also provides a computer readable storage medium on which a computer program is stored, when the program is executed by a processor, the said LQR-based anti-sway control method for the hoisting system is executed.

In summary, a LQR-based anti-sway control method and system for a hoisting system provided by the present invention obtaining a target position of a trolley, and obtaining a planned real-time path of the trolley according to the maximum velocity $v_m$ and maximum acceleration a m of the trolley and establishing a dynamic model of the hoisting system according to a Lagrange's equation, which can make the hoisting system operate more smoothly, reduce sway during operation, and quickly eliminate sway when in place while observing the lumped disturbance using an extended state observer.

Although the present invention has been disclosed as above in a preferred embodiment, it is not intended to limit the present invention. Any person skilled in the art can make some modifications and improvements without departing from the spirit and scope of the present invention. Therefore, the scope of protection of the present invention should be subject to those defined in the claims.

The invention claimed is:

1. A LQR-based anti-sway control method for a hoisting system, characterized in that comprising the following steps:
obtaining a target position of a trolley, and obtaining a planned real-time path of the trolley according to the maximum velocity $v_m$ and maximum acceleration $a_m$ of the trolley;
establishing a dynamic model of the hoisting system according to a Lagrange's equation, for the Lagrange's equation, the trolley displacement x, the spreader sway angle $\theta$, and the rope length l of the hoisting system being selected as generalized coordinate directions;
observing lumped disturbance d using an extened state observer, and compensating for same in a controller, the lumped disturbance d comprising the dynamic model error and external disturbance to the hoisting system;
tracking the planned real-time path of the trolley by a Q matrix and an R matrix using a linear quadratic regulator controller;
wherein, obtaining the planned real-time path of the trolley according to the maximum velocity $v_m$ and maximum acceleration $a_m$ of the trolley specifically comprising the following formula:

$$\dot{x}_r(t) = \begin{cases} \frac{v_m}{2}\left(1 - \cos\pi\frac{2a_m}{v_m}t\right), & 0 < t \le \frac{v_m}{2a_m} \\ v_m, & \frac{v_m}{2a_m} < t \le \frac{v_m}{2a_m} + t_c \\ \frac{v_m}{2}\left[1 + \cos\pi\frac{2a_m}{v_m}\left(t - \frac{v_m}{2a_m} - t_c\right)\right], & \frac{v_m}{2a_m} + t_c \le t \le \frac{v_m}{a_m} + t_c \end{cases}$$

wherein, t is the running time of the trolley, $t_c$ is the constant velocity time of the trolley, $\dot{x}_r(t)$ is the real-time velocity of the planned path of the trolley, obtaining the planned real-time path of the trolley by integrating $\dot{x}_r(t)$, the constant velocity time $t_c$ is determined according to the target position path of the trolley.

2. The LQR-based anti-sway control method for the hoisting system according to claim 1, characterized in that establishing a nonlinear equation of the system according to the Lagrange equation as follows:

$$\begin{cases} (M+m)\ddot{x} + m\ddot{l}\sin\theta + 2m\dot{l}\dot{\theta}\cos\theta + ml\ddot{\theta}\cos\theta - ml\dot{\theta}^2\sin\theta + \mu\dot{x} = F \\ 2\dot{l}\dot{\theta} + l\ddot{\theta} + \ddot{x}\cos\theta + g\sin\theta = 0 \\ m\ddot{l} + m\ddot{x}\sin\theta - ml\dot{\theta}^2 - mg\cos\theta = F_1 \end{cases}$$

wherein, M is the trolley mass, m is the spreader mass, and l is the rope length, $\theta$ is the spreader sway angle, $\mu$ is the friction coefficient, x is the trolley displacement, F is the motor force, $F_1$ is the pulling force between the trolley and the spreader, and g is the gravitational acceleration.

3. The LQR-based anti-sway control method for the hoisting system according to claim 2, characterized in that the rope length l remains unchanged, the spreader sway angle $\theta$ is greater than $-5°$ and less than $5°$, simplifying the nonlinear equation as follows:

$$\dot{l} = \ddot{l} = 0, \cos\theta \approx 1, \sin\theta \approx \theta$$

$$\ddot{\theta}\cos\theta - \dot{\theta}^2\sin\theta = \frac{d}{dt}(\dot{\theta}\cos\theta) = \frac{d}{dt}(\dot{\theta}) = \ddot{\theta}$$

obtaining the following linearization equation by further linearization:

$$\begin{cases} M\ddot{x} - mg\theta + \mu\dot{x} = F \\ l\ddot{\theta} + \ddot{x} + g\theta = 0 \end{cases}$$

4. The LQR-based anti-sway control method for the hoisting system according to claim 3, characterized in that obtaining the following equation by introducing a lumped disturbance d in the linearization equation:

$$\begin{cases} M\ddot{x} - mg\theta + \mu\dot{x} - d = F \\ l\ddot{\theta} + \ddot{x} + g\theta = 0 \end{cases}$$

taking the state variables as the trolley displacement x and spreader sway angle $\theta$, input as motor force F, establishing the following state equation, and rewriting the said equation into the standard state equation form in control theory:

$$\begin{cases} \dot{X} = AX + B(u+d) \\ y_m = C_m X \end{cases}$$

wherein:

$$A = \begin{bmatrix} 0 & 1 & 0 & 0 \\ 0 & -\frac{\mu}{M} & \frac{mg}{M} & 0 \\ 0 & 0 & 0 & 1 \\ 0 & \frac{\mu}{Ml} & -\frac{(M+m)g}{Ml} & 0 \end{bmatrix}$$

$$B = \begin{bmatrix} 0 & \frac{1}{M} & 0 & -\frac{1}{Ml} \end{bmatrix}^T$$

$$C_m = \begin{bmatrix} 1 & 0 & 0 & 0 \end{bmatrix}$$

u is the control variable, X is the vector representing the system state, $y_m$ is the system output, A is the system state matrix, B is the system input matrix, $C_m$ is the system output matrix, and the subscript m represents the directly observable.

5. The LQR-based anti-sway control method for the hoisting system according to claim 4, characterized in that a new variable $x_5 = d$ is introduced into the state equation, d is used to represent lumped disturbance:

$$\begin{cases} \dot{x}_1 = x_2 \\ \dot{x}_2 = \dfrac{1}{M}(-\mu x_2 + mgx_3 + x_5 + u) \\ \dot{x}_3 = x_4 \\ \dot{x}_4 = -\dfrac{1}{Ml}(-\mu x_2 + (M+m)gx_3 + x_5 + u) \\ \dot{x}_5 = \dot{d} \end{cases}$$

$$y_m = C_m X$$

wherein, $x_1$ is the trolley displacement, $x_2$ is the trolley velocity, $x_3$ is the spreader sway angle, $x_4$ is the angle velocity of the spreader sway angle.

6. The LQR-based anti-sway control method for the hoisting system according to claim 5, characterized in that in order to realize the observation of system state and lumped disturbance, the extended state observer is designed as follows:

$$\begin{cases} \dot{\hat{x}}_1 = \hat{x}_2 + l_1(\hat{x}_1 - x_1) \\ \dot{\hat{x}}_2 = \dfrac{1}{M}(-\mu \hat{x}_2 + mg\hat{x}_3 + \hat{x}_5 + u) + l_2(\hat{x}_1 - x_1) \\ \dot{\hat{x}}_3 = \hat{x}_4 + l_3(\hat{x}_1 - x_1) \\ \dot{\hat{x}}_4 = -\dfrac{1}{Ml}[-\mu \hat{x}_2 + (M+m)g\hat{x}_3 + \hat{x}_5 + u] + l_4(\hat{x}_1 - x_1) \\ \dot{\hat{x}}_5 = l_5(\hat{x}_1 - x_1) \end{cases}$$

wherein, $\hat{x}_1$, $\hat{x}_2$, $\hat{x}_3$, $\hat{x}_4$, $\hat{x}_5$ is the observed value of $x_1$, $x_2$, $x_3$, $x_4$, $x_5$, $l_1$, $l_2$, $l_3$, $l_4$, $l_5$ is the observer gain to be designed.

7. The LQR-based anti-sway control method for the hoisting system according to claim 1, characterized in that tracking the planned real-time path of the trolley by a Q matrix and an R matrix using a linear quadratic regulator controller comprising the use of the following composite control:

$$u = K_x[\hat{x}_1, \hat{x}_2, \hat{x}_3, \hat{x}_4] - \hat{x}_5$$

wherein, $K_x$ is the feedback control gain.

8. A LQR-based anti-sway control system for a hoisting system, characterized in that comprising: a server which comprising a memory, a processor and a computer program stored on the memory and running on the processor, when the the program executed by the processor, the method of claim 1 is executed.

9. A non-transitory computer readable storage medium on which a computer program is stored, characterized in that when the program is executed by a processor, the method of claim 1 is executed.

\* \* \* \* \*